US012610296B2

(12) United States Patent
Liu et al.

(10) Patent No.: US 12,610,296 B2
(45) Date of Patent: Apr. 21, 2026

(54) METHOD AND APPARATUS FOR ACCESSING NETWORK, DEVICE AND STORAGE MEDIUM

(71) Applicant: Tencent Technology (Shenzhen) Company Limited, Shenzhen (CN)

(72) Inventors: Honghao Liu, Shenzhen (CN); Wei-Ting Hsiao, Shenzhen (CN); Longwei Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 309 days.

(21) Appl. No.: 18/236,865

(22) Filed: Aug. 22, 2023

(65) Prior Publication Data

US 2023/0397067 A1      Dec. 7, 2023

Related U.S. Application Data

(63) Continuation of application No. PCT/CN2022/113468, filed on Aug. 19, 2022.

(30) Foreign Application Priority Data

Oct. 15, 2021    (CN) .......................... 202111203937.5

(51) Int. Cl.
*H04W 36/08* (2009.01)
*H04W 36/30* (2009.01)

(52) U.S. Cl.
CPC ........... *H04W 36/08* (2013.01); *H04W 36/30* (2013.01)

(58) Field of Classification Search
CPC ..... H04W 36/08; H04W 36/30; H04W 84/12; H04W 24/08; H04W 48/16; H04W 48/20; H04L 65/1036; H04L 65/80; Y02D 30/70
See application file for complete search history.

(56) References Cited

U.S. PATENT DOCUMENTS

| 2010/0015921 A1 | 1/2010 | Yavuz et al. |
| 2016/0029412 A1* | 1/2016 | Naeini .............. H04W 74/0808 |
| | | 370/329 |

(Continued)

FOREIGN PATENT DOCUMENTS

| CN | 104411016 A | 3/2015 |
| CN | 107534916 A | 1/2018 |

(Continued)

OTHER PUBLICATIONS

Tencent Technology, WO, PCT/CN2022/113468, Nov. 17, 2022, 4 pgs.

(Continued)

*Primary Examiner* — Shawn D Miller
(74) *Attorney, Agent, or Firm* — Morgan, Lewis & Bockius LLP

(57) ABSTRACT

This application provides a method for accessing a wireless network performed by an electronic device acting as a station (STA). The method includes: determining interference information of a target channel, the target channel being a channel currently connected between the STA and an access point (AP); determining a target network access parameter group corresponding to the interference information; disconnecting the target channel between the STA and the AP; and accessing the AP via a new channel established between the STA and the AP according to the target network access parameter group.

20 Claims, 3 Drawing Sheets

(56) References Cited

U.S. PATENT DOCUMENTS

| 2016/0262054 | A1 | | 9/2016 | Singh et al. | |
| 2020/0404512 | A1 | | 12/2020 | Heidari et al. | |
| 2022/0330368 | A1 | * | 10/2022 | Watanabe | H04W 36/06 |
| 2024/0107345 | A1 | * | 3/2024 | Lopez | H04W 76/25 |

FOREIGN PATENT DOCUMENTS

| CN | 108834159 | A | 11/2018 |
| CN | 110113804 | A | 8/2019 |

OTHER PUBLICATIONS

Tencent Technology, IPRP, PCT/CN2022/113468, Apr. 16, 2024, 5 pgs.
Tencent Technology, ISR, PCT/CN2022/113468, Nov. 17, 2022, 2 pgs.
Tencent Technology, Extended European Search Report, EP Patent Application No. 22879987.0, Jun. 26, 2024, 13 pgs.

* cited by examiner

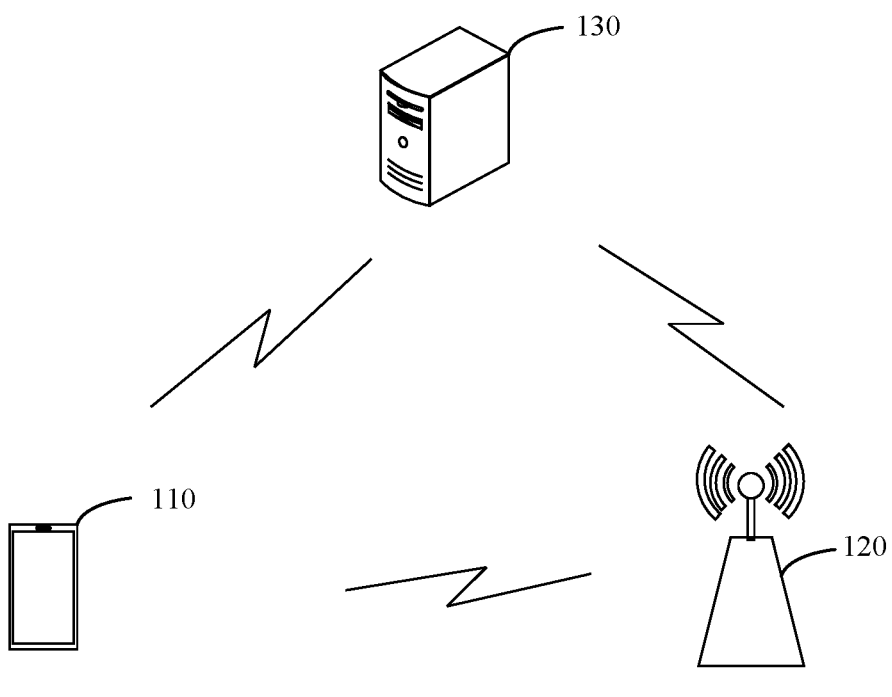

FIG. 1

Determine, by an STA, interference information of a target channel between the STA and an AP     S201

Determine, by the STA, a target network access parameter group corresponding to the interference information     S202

Disconnect, by the STA, the target channel between the STA and the AP     S203

Access, by the STA, the AP via a new channel established between the STA and the AP according to the target network access parameter group     S204

FIG. 2

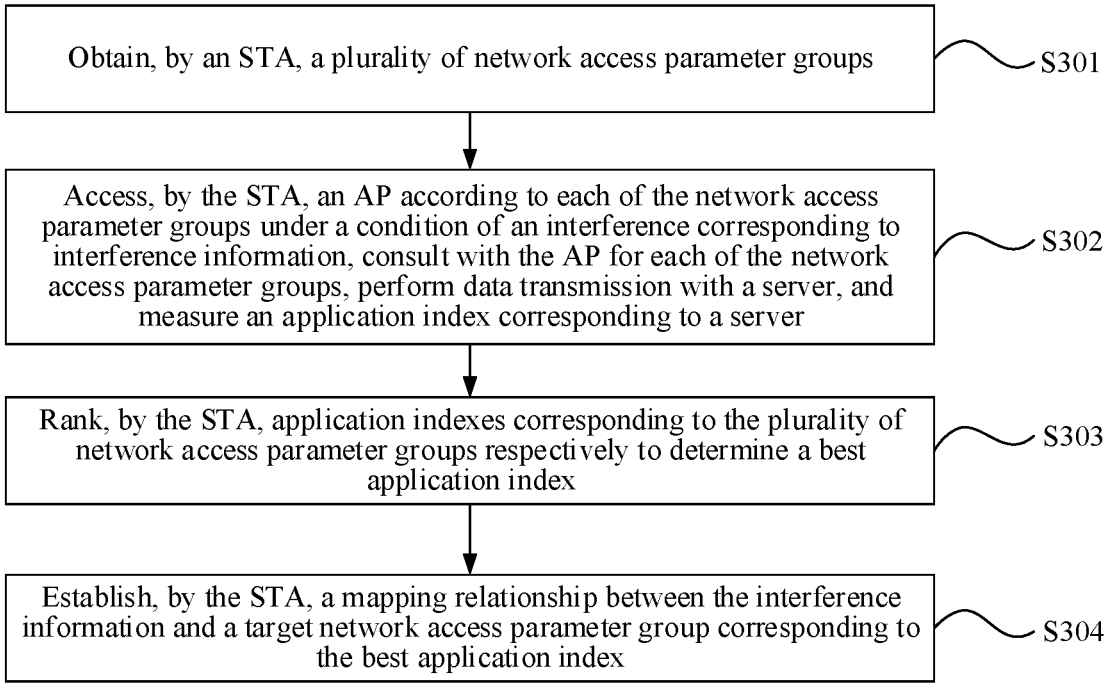

Obtain, by an STA, a plurality of network access parameter groups ⟶ S301

Access, by the STA, an AP according to each of the network access parameter groups under a condition of an interference corresponding to interference information, consult with the AP for each of the network access parameter groups, perform data transmission with a server, and measure an application index corresponding to a server ⟶ S302

Rank, by the STA, application indexes corresponding to the plurality of network access parameter groups respectively to determine a best application index ⟶ S303

Establish, by the STA, a mapping relationship between the interference information and a target network access parameter group corresponding to the best application index ⟶ S304

FIG. 3

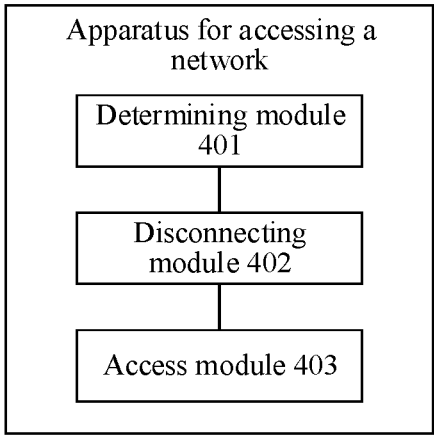

Apparatus for accessing a network

Determining module 401

Disconnecting module 402

Access module 403

FIG. 4

METHOD AND APPARATUS FOR ACCESSING NETWORK, DEVICE AND STORAGE MEDIUM

CROSS-REFERENCE TO RELATED APPLICATIONS

This application is a continuation application of PCT Patent Application No. PCT/CN2022/113468, entitled "METHOD AND APPARATUS FOR ACCESSING NETWORK, DEVICE AND STORAGE MEDIUM" filed on Aug. 19, 2022, which claims priority to Chinese Patent Application No. 202111203937.5, entitled "METHOD AND APPARATUS FOR ACCESSING NETWORK, DEVICE AND STORAGE MEDIUM" and filed with the Chinese Patent Office on Oct. 15, 2021, all of which is incorporated by reference in its entirety.

FIELD OF THE TECHNOLOGY

Embodiments of this application relate to the technical field of communications, and in particular to a method and apparatus for accessing a network, a device and a storage medium.

BACKGROUND OF THE DISCLOSURE

At present, most of stations (STAs) are connected to an access point (AP), which includes: scanning, authentication and association flows. In an association flow, the STAs use a supreme capacity that can be supported currently, including: a wireless fidelity (WiFi) version, a maximum modulation and coding scheme (MCS) level, a used bandwidth, an aggregate-management protocol data unit (A-MPDU) aggregation depth, a spatial flow quantity and the like. Further, the STA and AP may consult specific to these parameters in order to use a high-effect MCS modulation level, a high bandwidth, a large A-MPDU aggregation depth and a large spatial flow quantity so as to achieve a highest uplink and downlink double-way transmission rate.

However, the highest uplink and downlink double-way transmission rate costs reduction of an antijamming capability, which leads to a failure in transmission. Based on this, the STA may try retransmission, resulting in reduction of an available bandwidth and prolonging of a transmission delay. A user has had poor experience such as picture lagging and non-smooth operation in a cloud video application sensitive to bandwidth and delay jitter.

SUMMARY

This application provides a method and apparatus for accessing a network, a device and a storage medium, so that under a condition of a certain interference degree, a proper network access parameter group is selected, and thus an image quality of a cloud video application and operation smoothness for a user are guaranteed.

In a first aspect, an embodiment of this application provides a method for accessing a wireless network performed by an electronic device acting as a station (STA) and the method including: determining interference information of a target channel, the target channel being a channel currently connected between the STA and an access point (AP); determining a target network access parameter group corresponding to the interference information; disconnecting the target channel between the STA and the AP; and accessing the AP via a new channel established between the STA and the AP according to the target network access parameter group.

In a second aspect, an embodiment of this application provides an electronic device, including: a processor and a memory, the memory being configured to store a computer program, and the processor being configured to run the computer program stored in the memory and cause the electronic device to execute the method in the first aspect or its various implementations.

In a third aspect, an embodiment of this application provides a non-transitory computer-readable storage medium, configured to store a computer program, the computer program, when executed by a processor of an electronic device, causing the electronic device to implement the method in the first aspect or its various implementations.

BRIEF DESCRIPTION OF THE DRAWINGS

FIG. 1 is a diagram of an application scenario provided by an embodiment of this application.

FIG. 2 is a flowchart of a method for accessing a network provided by an embodiment of this application.

FIG. 3 is a flowchart of another method for accessing a network provided by an embodiment of this application.

FIG. 4 is a schematic diagram of an apparatus for accessing a network provided by an embodiment of this application.

DESCRIPTION OF EMBODIMENTS

Figure 5:
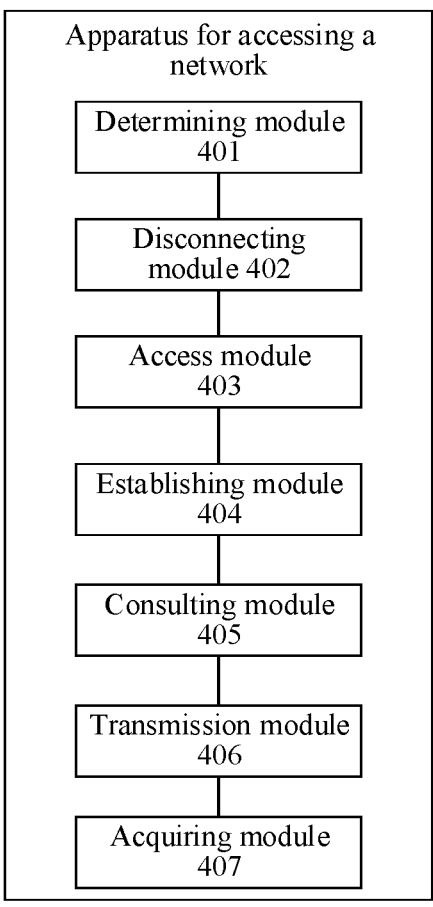
FIG. 5 is a schematic diagram of another apparatus for accessing a network provided by an embodiment of this application.

Technical solutions in embodiments of this application are described clearly and completely below with reference to accompanying drawings in the embodiments of this application.

In the specification, claims, and the foregoing accompanying drawings of this application, the terms "first", "second", and the like are intended to distinguish similar objects rather than indicating a specific order or a precedence order. It is to be understood that such used data is interchangeable where appropriate so that the embodiments of this application described here can be implemented in an order other than those illustrated or described here. Moreover, the terms "include", "have" and any other variants of them mean to cover the non-exclusive inclusion, for example, a process, method, system, product, or server that includes a series of steps or units is not necessarily limited to those expressly listed steps or units, but may include other steps or units not expressly listed or inherent to such a process, method, product, or device.

In the embodiments of this application, "exemplary" or "for example" and the like are used for representing an example, example illustration or description, any embodiment or solution described as "exemplary" or "for example" in the embodiments of this application is not to be construed as being more preferred or better than other embodiments or solutions. Or rather, "exemplary" or "for example" and the like are used for presenting relative concepts in specific manners.

As described above, at present, when an STA uses a supreme capacity that can be supported currently, a highest uplink and downlink double-way transmission rate may be achieved. However, the highest uplink and downlink double-way transmission rate costs reduction of an antijamming capability, which leads to a failure in transmission. Based on this, the STA may try retransmission, resulting in reduction of an available bandwidth and prolonging of a transmission delay. A user has had poor experience such as picture lagging and non-smooth operation in a cloud video application sensitive to bandwidth and delay jitter.

To solve the foregoing technical problems, this application provides the following technical solution. Under a condition of a certain interference, the STA endeavors to select a proper network access parameter group, and thus an image quality of a cloud video application and operation smoothness for a user are guaranteed.

It is to be understood that the technical solutions of this application may be applied to, but are not limited to, the following scenarios.

Exemplarily, FIG. 1 is a diagram of an application scenario provided by an embodiment of this application. As shown in FIG. 1, the application scenarios may include an STA 110, an AP 120 and a server 130. The STA 110 and the AP 120 may communicate through an application programming interface (API), and the AP 120 may communicate with the server 130.

Establishing a connection between the STA and the AP may be divided into three steps: scanning, authentication and association. When the STA enters an AP signal coverage, APs within the coverage may be scanned. Specifically, the STA may actively scan different channels; or the STA may also monitor, on each channel supported thereby, beacon frames sent by the APs at a fixed period to be informed of the APs existing around. Each AP is located on a channel, and different APs may be located on different channels or may be located on the same channel. After scanning is completed, the STA needs to authenticate a scanned AP, for example, the STA may perform authentication through open system authentication, shared key authentication or identity pre-authentication and the like. After authentication is completed, the STA may be associated with the AP and consult with the AP for network access parameters. Specifically, the STA may send an associate request frame including the network access parameters, various parameters of the STA per se, and various parameters selected according to a service configuration to the AP, and the AP, after receiving the associate request frame, may judge whether the STA performs accessing authentication subsequently and respond to the STA. After association is completed, it indicates that a wireless link has been established between the STA and the AP.

In some implementations, the STA may be a mobile phone, a tablet computer, a desktop computer, a laptop computer, a hand-held computer, a notebook computer, a vehicle-mounted device, an ultra-mobile personal computer (UMPC), a netbook, a cellular phone, a personal digital assistant (PDA), an augmented reality (AR)/virtual reality (VR) device and the like, but is not limited to them.

The AP is a hub in a conventional wired network and is also a most common device for setting up a small wireless local area network. The AP is equivalent to a bridge connecting a wired network and a wireless network and mainly functions as connecting various wireless network clients and then making the wireless network access the Ethernet. Most of wireless APs support functions of multi-user accessing, data encryption, multi-rate sending and the like, and some wireless APs also have a wireless network management function. As for a small-range wireless local area network like in a household and office, only one AP may be needed generally to realize wireless accessing of all computers. An indoor coverage of the AP is generally 30 m-100 m.

It is to be understood that the server may be a server providing a support for a cloud video application on the STA. The server may be an independent physical server, or may be a server cluster or a distributed system composed of a plurality of physical servers, or may also be a cloud server providing a cloud computing service.

Besides, FIG. 1 exemplarily shows one STA, one AP and one server, actually, other quantities of STAs, APs and servers may be included, which is not limited in this application.

After the application scenario of the embodiment of this application is introduced, the technical solutions of this application will be set forth in detail below.

FIG. 2 is a flowchart of a method for accessing a network provided by an embodiment of this application. The method may be executed by the STA 110 shown in FIG. 1, or may be executed by an electronic device 600 shown in FIG. 6, but is not limited to this. As shown in FIG. 2, the method may include:

S201: Determine, by an STA, interference information of a target channel between the STA and an AP.

S202: Determine, by the STA, a target network access parameter group corresponding to the interference information.

S203: Disconnect, by the STA, the target channel between the STA and the AP.

S204: Access, by the STA, the AP via a new channel established between the STA and the AP according to the target network access parameter group.

The target channel is a channel between the STA and the AP connected with the STA currently. It is to be understood that the target channel is a channel where the AP is located.

In some implementations, the STA may determine interference information of the target channel before data transmission with a server starts. For example: The STA may determine the interference information of the target channel when a user just starts a cloud video application but does not start cloud video data transmission.

In some other implementations, the STA may determine the interference information of the target channel when a pause operation is acquired. The pause operation may be an operation for double clicking a page which is in the middle of playing a cloud video by the user, or may also be an operation for clicking a pause button in the page which is in the middle of playing the cloud video by the user, but is not limited to this.

In yet some other implementations, the STA may determine the interference information of the target channel when a refresh operation is acquired. The refresh operation may be an operation for pulling down, by the user, a cloud video play list page which is in the middle of being browsed or a web page which is in the middle of being browsed, or may also be an operation for clicking, by the user, a refresh button in the cloud video play list page which is in the middle of being browsed or the web page which is in the middle of being browsed, but is not limited to this.

In yet some other implementations, the STA may determine the interference information of the target channel when it is detected that a current network environment is lagging. For example: when the user opens a cloud video application software or a web page, the STA may actively detect a current network environment, and determine the interference information of the target channel after it is determined that a WiFi signal intensity of a current connection is lower than a first threshold. Or, the STA may determine the interference information of the target channel when information such as "buffering" or "loading" displayed in the current cloud video playing page or the web page is detected.

It is to be understood that this application does not limit time of the determining, by the STA, the interference information of the target channel.

In some implementations, the STA may scan a full frequency band or part of the frequency band to obtain a scanning result and then determine the interference information according to the scanning result.

For example, the full frequency band may be a frequency band of 2.4 GHz, or may also be a frequency band of 5 GHz, which is not limited in this application.

For example, the part of the frequency band may include: a first frequency band where the target channel is located and an adjacent frequency band of the first frequency band. For example: the target channel is a channel 1 of the frequency band of 2.4 GHz, so the STA may scan channels 1-13 of the frequency band of 2.4 GHz, which is not limited in this application.

In some implementations, the STA may perform scanning according to a preset scanning sequence. For example, the STA may perform scanning according to a preset channel scanning sequence, for example: hypothetically, each channel has only one index, the STA may scan channels according to a sequence of the channel indexes from small to large, or scan the channels according to a sequence of the channel indexes from large to small, or the STA scans the target channel firstly and then scan the other channels in a sequence of other channel indexes from small to large or from large to small, in a word, this application does not limit a preset channel scanning sequence.

In some implementations, the above scanning result may include but not limited to at least one of the following: a signal intensity of the above AP, a WiFi interference intensity of the target channel, a WiFi interference intensity of the adjacent frequency band of the frequency band where the target channel is located, and the frequency band where the target channel is located, that is, a non-WiFi interference intensity of the first frequency band, and the quantity of other STAs accessing the AP besides the STA.

In some implementations, the WiFi interference intensity of the target channel may be measured through at least one of the quantity of other APs on the target channel and signal intensities of the other APs, but is not limited to this, for example: the larger the quantity of the APs on the target channel is, the greater the WiFi interference intensity of the target channel is; and the greater the signal intensities of the other APs on the target channel are, the greater the WiFi interference intensity of the target channel is.

In some implementations, the WiFi interference intensity of the adjacent frequency band may be measured through at least one of the quantity of other APs on the adjacent frequency band and signal intensities of the other APs, but is not limited to this, for example: the larger the quantity of the APs on the adjacent frequency band is, the greater the WiFi interference intensity of the adjacent frequency band is; and the greater the signal intensities of the other APs on the adjacent frequency band are, the greater the WiFi interference intensity of the adjacent frequency band is.

In some implementations, the non-WiFi interference intensity of the first frequency band may include: at least one of interference intensities of a Bluetooth signal and a cell signal of the first frequency band.

It is to be understood that the STA may determine the interference information of the target channel in, but not limited to, any one of the following implementations:

implementation 1, the STA determines scores corresponding to all items respectively in the above scanning result, may perform weighted averaging on these scores so as to obtain an interference score, and determines an interference score interval where the interference score is located; and implementation 2, the STA determines priorities of all the items in the above scanning result, and selects some items with priorities being greater than a priority threshold, further, as for the scores corresponding to the some selected items respectively, the STA may perform weighted averaging on these scores so as to obtain the interference score, and determines the interference score interval where the interference score is located.

Description is made below specific to the implementations 1 and 2.

In some implementations, the STA may pre-establish a mapping relationship between signal intensity intervals of a plurality of APs and a plurality of scores, a mapping relationship between WiFi interference intensity intervals of the target channel and the plurality of scores, a mapping relationship between WiFi interference intensity intervals of the adjacent frequency band of the frequency band where the target channel is located and the plurality of scores, a mapping relationship between non-WiFi interference intensity intervals of the first frequency band and the plurality of scores, and a mapping relationship between quantity intervals of the other STAs accessing the AP besides the STA and the plurality of scores. Based on this, the STA may obtain scores corresponding to all the items or some items respectively in the scanning result according to the above scanning result and these mapping relationships.

In some implementations, weights corresponding to all the items or some items in the scanning result may be pre-set, or dynamically set, which is not limited in this application.

For example, hypothetically, in the scanning result, a score corresponding to the signal intensity of the AP is s1, a score corresponding to the WiFi interference intensity of the target channel is s2, a score corresponding to the WiFi interference intensity of the adjacent frequency band of the frequency band where the target channel is located is s3, a score corresponding to the non-WiFi interference intensity of the first frequency band is s4 and a score corresponding to the quantity of the other STAs accessing the AP besides the STA is s5, the weights of all the items in the above scanning result are set to be 0.3, 0.15, 0.15, 0.1 and 0.3 respectively, and then weighted averaging is performed on these items to obtain the interference score $(0.3*s1+0.15*s2+0.15*s3+0.1*s4+0.3*s5)/5$.

The following description is made specific to the implementation 2.

In some implementations, the priorities of all the items in the above scanning result may be pre-set, or dynamically set, which is not limited in this application.

In some implementations, the above priority threshold may be pre-set, or dynamically set, which is not limited in this application.

For example, the STA may set the priority of the signal intensity of the AP to be 5, the priority of the WiFi interference intensity of the target channel to be 4, the priority of the WiFi interference intensity of the adjacent frequency band of the frequency band where the target channel is located to be 3, the priority of the non-WiFi interference intensity of the first frequency band to be 2 and the priority of the quantity of the other STAs accessing the AP besides the STAs to be 1, the STA may set the priority threshold to be 3, at this moment, the STA determines some items with the priorities being higher than the priority threshold to be: the signal intensity of the AP and the Wi-Fi interference intensity of the target channel. Further, the STA may perform scoring on the two items according to the above scoring rule, perform weighted averaging on scoring results so as to obtain a final interference score, and determine the interference score interval where the interference score is located.

In some implementations, the STA may determine the interference degree according to the interference score interval.

In some implementations, the STA may divide an interference score total interval so as to obtain a plurality of interference score intervals, each interference score interval may correspond to one interference degree, and based on this, the STA may determine the interference degree according to the interference score.

For example, hypothetically, the interference score total interval is [0,100], the STA may divide the interval into five interference score intervals, respectively an interval [80, 100], an interval [60,80), an interval [40,60), an interval [20,40) and an interval [0,20), and the interference degrees corresponding to them are: a degree 1, a degree 2, a degree 3, a degree 4 and a degree 5 respectively. A corresponding relationship between the interference degrees and the interference score intervals may be shown in, but not limited to, Table 1.

TABLE 1

| Interference score interval | Interference degree |
| --- | --- |
| [80100] | Degree 1 |
| [60, 80) | Degree 2 |
| [40, 60) | Degree 3 |
| [20, 40) | Degree 4 |
| [0, 20) | Degree 5 |

It is to be understood that this application does neither limit how to divide the interference score interval, nor limit the corresponding relationship between the interference degrees and the interference score intervals.

In some implementations, the above interference information may include but not limited to at least one of the following: an interference degree and an interference score interval.

In some implementations, the target network access parameter group corresponding to the interference information may be obtained through experience, for example: when the interference information is determined, as for a plurality of network access parameter groups, application indexes of an application side are measured respectively so as to obtain a best or proper network access parameter group, the network access parameter group is used as the target network access parameter group, in other words, through an experiment, the STA may establish the mapping relationship between the interference information and the target network access parameter group.

In some implementations, any network access parameter group provided by the embodiment of this application may include but not limited to at least one of the following: a supported maximum bandwidth, a supported maximum MCS modulation level, a supported maximum A-MPDU aggregation degree, other access parameters and the like. The other access parameters here may be related parameters for which the STA needs to consult with the AP.

In some implementations, some parameters in any network access parameter group provided by the embodiment of this application may be used for an associate request frame, some parameters may be used for other action frames, which is not limited here.

It is to be understood that any above network access parameter group may be used for uplink data transmission or downlink data transmission, which is not limited in this application.

In some implementations, after S204, the STA may consult with the AP for the target network access parameter group, and perform data transmission with the server according to a consulted target network access parameter group.

Exemplarily, hypothetically, all items included in the target network access parameter group determined by the STA are as follows: a supported maximum bandwidth being 40 MHz, a supported maximum MCS being 5, a supported maximum A-MPDU aggregation degree being 16, other access parameters A being Y, and other access parameters B being ZX. The STA may carry the target network access parameter group to the associate request frame and send it to the AP. The AP, after receiving the associate request frame, may make a response according its own capacity, hypothetically, the maximum bandwidth, the maximum MCS and the maximum A-MPDU aggregation degree that the AP can support are MHz, 5 and 8 respectively. Therefore, the AP may send, to the STA, the network access parameter grout that it supports. The STA, after receiving these parameters, selects a smaller network access parameter group in two network access parameter groups as the consulted target network access parameter group, that is, the consulted target network access parameter group includes: the supported maximum bandwidth being 20 MHz, the supported maximum MCS being 5 and the supported maximum A-MPDU aggregation degree being 8. Then, the STA may perform data transmission with the server according to the consulted target network access parameter group.

In some implementations, the STA, after finishing the data transmission with the server, may disconnect from the AP, then acquires an original network access parameter group and accesses into the AP again according to the original network access parameter group, which is not limited in this application.

The above original network access parameter group is a network access parameter group used when accessing the AP before the STA accesses into the AP again according to the target network access parameter group.

In some other implementations, the STA, after finishing the data transmission with the server, may also continue using the target network access parameter group to keep connected with the AP, which is not limited in this application.

To sum up, the technical solutions provided in the embodiments of this application at least bring the following beneficial effects. The STA may select the proper network access parameter group under the condition of a certain interference degree, and thus, the image quality of the cloud video application and the operation smoothness for the user are guaranteed.

Besides, the STA may directly determine the target network access parameter group corresponding to the interference information based on the mapping relationship between the interference information and the target network access parameter group, so the STA may quickly determine the target network access parameter group, and thus the image quality of the cloud video application and the operation smoothness for the user may be guaranteed efficiently.

To sum up, the target network access parameter group corresponding to the interference information may be obtained through an experiment, so as to establish the mapping relationship between the interference information and the target network access parameter group, which is described in detail below.

In some implementations, FIG. 3 is a flowchart of a method for establishing a mapping relationship between interference information and a target network access parameter group provided by an embodiment of this application. As shown in FIG. 3, the method may include:

S301: Acquire, by the STA, a plurality of network access parameter groups.

S302: Access, by the STA, an AP according to each of the network access parameter groups under a condition of an interference corresponding to interference information, consult with the AP for each of the network access parameter groups, perform data transmission with a server, and measure an application index corresponding to the server.

S303: Rank, by the STA, application indexes corresponding to the plurality of network access parameter groups respectively to determine a best application index.

S304: Establish, by the STA, a mapping relationship between the interference information and a target network access parameter group corresponding to the best application index.

It is to be understood that the plurality of network access parameter groups include the target network access parameter group. Exemplarily, the plurality of network access parameter groups may be shown in Table 2.

above two network access parameter groups. For example, the STA may select a smaller network access parameter group including the supported maximum bandwidth, the supported maximum MCS, the supported maximum A-MPDU aggregation degree and the like in the above two network access parameter groups to establish the connection with the AP.

In the embodiment of this application, the STA may measure the application indexes in, but not limited to, the following scenarios. The STA may open a livestreaming page in cloud video application software, and then measure the application index corresponding to the server at the moment, which is not limited in this application.

In some implementations, the application index may include but not limited to at least one of the following: bandwidth jitter, delay jitter and a framewise lagging rate.

In some implementations, under the condition of the interference corresponding to the above interference information, the STA, after measuring the application indexes obtained based on the different network access parameter groups, may perform normalization processing on these application indexes specific to the application index measured based on each network access parameter group, and perform weighted averaging on a normalization processing result so as to obtain weighted average values corresponding to these application indexes, and the STA may determine an application index corresponding to the smallest weighted average value as a best application index.

For example, under the condition of interference corresponding to the interference degree 1, the STA, according to five different network access parameter groups, that is, a group A, a group B, a group C, a group D and a group E, accesses into the same AP respectively, performs the data

TABLE 2

| Network access parameter group | Supported maximum bandwidth | Supported maximum MCS | Supported maximum A-MPDU aggregation degree | Other access parameters A | Other access parameters B |
|---|---|---|---|---|---|
| Group A | 40 MHz | 7 | 8 | X | XY |
| Group B | 80 MHz | 11 | 16 | Y | YY |
| Group C | 160 MHz | 11 | 64 | Z | ZY |
| Group D | 80 MHz | 9 | 32 | X | YY |
| Group E | 40 MHz | 5 | 16 | Y | ZX |

It is to be understood that S302 may be understood as an experiment stage according to each network access parameter group. Before the experiment stage of the STA specific to each network access parameter group, the STA may disconnect from the AP currently, then access the AP according to the network access parameter group under an interference environment corresponding to the above interference information, consult with the AP for the network access parameter group and perform the data transmission with the server through the consulted network access parameter group so as to measure the application index corresponding to the server.

For example, the STA may send, to the AP, the associate request frame including the network access parameter groups. The AP, after receiving the associate request frame, may send, to the STA, a network access parameter group including such as the maximum bandwidth, the maximum MCS, the maximum A-MPDE aggregation degree and the like that it supports. The STA, after receiving this, may establish a connection with the AP in combination with the transmission with the server and finally measures five groups of application indexes, and the five groups of application indexes each include: bandwidth jitter b1, delay jitter t1 and a framewise lagging rate s1. Weights of the above application indexes may be set to be: 0.3, 0.4 and 0.3, then normalization processing is performed on the five groups of application indexes, hypothetically, an obtained normalization processing result is the bandwidth jitter b2, the delay jitter t2 and the framewise lagging rate s2, weighted averaging may be performed on the normalization processing result, and a result $(0.3*b2+0.4*t2+0.3*s2)/3$ may be obtained. The smaller a computing result is, the smaller the bandwidth jitter, the delay jitter and the framewise lagging rate are, that is, the more stable a transmission result of the channel is, so a smallest result after computing may be used as the best application index.

In some other implementations, under the condition of the interference corresponding to the above interference information, the STA, after measuring the application indexes obtained based on the different network access parameter groups, may select the application indexes with the priorities being greater than the priority threshold among the application indexes measured in each network access parameter group, may perform normalization processing on these selected application indexes, and may perform weighted averaging on a normalization processing result so as to obtain weighted average values corresponding to these application indexes, and the STA may determine an application index corresponding to the smallest weighted average value as a best application index.

In some implementations, the above priority threshold may be preset, or dynamically set, which is not limited in this application.

For example, the STA may set the priority of the bandwidth jitter to be 5, the priority of the delay jitter to be 4, and the priority of the framewise lagging rate to be 3, the STA may set the priority threshold to be 3, at this moment, the STA determines the application indexes with the priorities being greater than the priority threshold to be the bandwidth jitter and the delay jitter. Further, the STA may perform normalization processing on the two application indexes, and perform weighted averaging on a normalization processing result so as to obtain weighted average values corresponding to these application indexes, and the STA may determine the application index corresponding to the smallest weighted average value as the best application index.

It is to be understood that this application does not limit the manner of determining the best application index according to the application indexes.

It is to be understood that under the interference environment corresponding to the above interference information, the network access parameter group corresponding to the best application index is the target network access parameter group.

It is to be understood that the above process is a process that under the interference environment corresponding to the same interference information, the STA establishes the mapping relationship between the interference information and the target network access parameter group, actually, the STA may also establish a mapping relationship between more interference information and more target network access parameter groups.

Exemplarily, when the interference information includes the interference degree, the STA may establish a mapping relationship between a plurality of interference degrees and a plurality of target network access parameter groups, shown in Table 3. Table 3 lists a mapping relationship between part of interference degrees and part of target network access parameter groups, which is not limited here.

TABLE 3

| Interference degree | Target network access parameter group |
| --- | --- |
| Degree 1 | Group E |
| Degree 2 | Group A |
| Degree 3 | Group B |
| Degree 4 | Group D |
| Degree 5 | Group C |

For example, as shown in a second row of Table 3, when the interference degree is the degree 1, the STA determines the best application index as the application index corresponding to the server when the STA accesses into the AP again according to the group E and perform the data transmission with the server, the STA may determine the target network access parameter group as the group E when the interference degree is the degree 1.

Exemplarily, when the interference information includes the interference score intervals, the STA may establish a mapping relationship between the plurality of interference score intervals and the plurality of target network access parameter groups, as shown in Table 4. Table 4 lists only a mapping relationship between part of interference score intervals and part of target network access parameter groups, which is no limited here.

TABLE 4

| Interference score interval | Target network access parameter group |
| --- | --- |
| [80100] | Group E |
| [60, 80) | Group A |
| [40, 60) | Group B |
| [20, 40) | Group D |
| [0, 20) | Group C |

For example, as shown in a second row of Table 4, when the interference score interval is [80,100], the STA determines the best application index as the application index corresponding to the server when the STA accesses into the AP again according to the group E and performs the data transmission with the server, so the STA may determine the target network access parameter group as the group E when the interference score interval is [80,100].

In some other implementations, when the interference information includes the interference degrees and the interference score intervals, the STA may establish a mapping relationship between the plurality of interference information and the plurality of target network access parameter groups, as shown in Table 5. Table 5 lists only a mapping relationship between part of interference information and part of target network access parameter groups, which is not limited here.

TABLE 5

| Interference degree | Interference score interval | Target network access parameter group |
| --- | --- | --- |
| Degree 1 | [80100] | Group E |
| Degree 2 | [60, 80) | Group A |
| Degree 3 | [40, 60) | Group B |
| Degree 4 | [20, 40) | Group D |
| Degree 5 | [0, 20) | Group C |

For example, as shown in a second row of Table 5, when the interference degree is the degree 1 and the interference score interval is [80,100], the STA determines the best application index as the application index corresponding to the server when the STA accesses into the AP again according to the group E and performs the data transmission with the server, so the STA may determine the target network access parameter group as the group E when the interference degree is the degree 1 and the interference score interval is [80,100].

In some implementations, the STA may record the above mapping relationship in a local or a cloud database, which is not limited in this application.

In some implementations, the STA may search for a corresponding target network access parameter group according to the interference information of the target channel in the above mapping relationship between the interference information and the target network access parameter group, which is not limited in this application.

To sum up, it may be known from the above experiment process that the STA may select the network access parameter group corresponding to the best application index as the target network access parameter group under the condition of a certain interference degree, and thus the image quality of the cloud video application and the operation smoothness for the user are guaranteed.

Besides, as measurement of the application indexes such as the bandwidth jitter, the delay jitter and the framewise lagging rate is easy, an establishing process of the above mapping relationship may be accelerated.

FIG. 4 is a schematic diagram of an apparatus for accessing a network provided by an embodiment of this application. The apparatus for accessing a network may be the STA 110 shown in FIG. 1 and includes: a determining module 401, a disconnecting module 402 and an access module 403. The determining module 401 is configured to determine interference information of a target channel, the target channel being a channel currently connected therewith between the STA and an access point (AP); and determine a target network access parameter group corresponding to the interference information; The disconnecting module 402 is configured to disconnect the target channel between the STA and the AP. The access module 403 is configured to access the AP via a new channel established between the STA and the AP according to the target network access parameter group.

FIG. 5 is a schematic diagram of another apparatus for accessing a network provided by an embodiment of this application. On the basis of the apparatus for accessing a network shown in FIG. 4, further, in some implementations, the apparatus for accessing a network further includes: an establishing module 404, configured to establish a mapping relationship between the interference information and the target network access parameter group. The determining module 401 is specifically configured to determine the target network access parameter group according to the mapping relationship and the interference information.

In some implementations, the establishing module 404 is specifically configured to: acquire a plurality of network access parameter groups, the plurality of network access parameter groups including the target network access parameter group; access the AP according to each of the network access parameter groups under a condition of an interference corresponding to the interference information, consult with the AP for each of the network access parameter groups, perform data transmission with a server, and measure an application index corresponding to the server; rank application indexes corresponding to the plurality of network access parameter groups respectively to determine a best application index; and establish the mapping relationship between the interference information and the target network access parameter group corresponding to the best application index.

In some implementations, the application indexes include at least one of the following: bandwidth jitter, delay jitter and a framewise lagging rate.

In some implementations, the determining module 401 is specifically configured to: scan a full frequency band or part of the frequency band to obtain a scanning result, the part of the frequency band including: a first frequency band where the target channel is located and an adjacent frequency band of the first frequency band; and determine the interference information according to the scanning result.

In some implementations, the scanning result includes at least one of the following: a signal intensity of the AP; a WiFi interference intensity of the target channel; a WiFi interference intensity of the adjacent frequency band; a non-wireless fidelity (WiFi) interference intensity of the first frequency band; and the quantity of other STAs accessing the AP besides the STA.

In some implementations, the interference information includes at least one of the following: an interference degree and an interference score interval.

In some implementations, the apparatus for accessing a network further includes: a consulting module 405, a transmission module 406 and an acquiring module 407. The consulting module 405 is configured to consult with the AP for the target network access parameter group. The transmission module 406 is configured to perform data transmission with a server according to a consulted target network access parameter group. The disconnecting module 402 is further configured to disconnect the STA from the AP after completing the data transmission with the server. The acquiring module 407 is configured to obtain an original network access parameter group. The access module 403 is further configured to access the AP according to the original network access parameter group.

In some implementations, the determining module 401 is specifically configured to: determine the interference information before the data transmission with the server starts.

In some implementations, the determining module 401 is specifically configured to: determine the interference information when a pause operation is acquired. The pause operation is used for pausing the data transmission with the server.

It is to be understood that apparatus embodiments may mutually correspond to method embodiments, and similar descriptions may refer to the method embodiments. Details are not described herein to avoid repetitions.

Specifically, the apparatus for accessing a network shown in FIG. 4 and FIG. 5 may execute the method embodiments on a STA side, besides, the above description and other operations and/or functions of all the modules in the apparatus for accessing a network are used for implementing corresponding flows in each method of the STA side respectively, and details are not described herein for the sake of being concise.

The apparatus for accessing a network of the embodiment of this application is described from the perspective of a function module above with reference to the accompanying drawings. It is to be understood that the function module may be implemented in a form of hardware, or through instructions in a form of software, or through combining a hardware module and a software module. Specifically, all the steps of the method embodiments in the embodiments of this application may be completed through an integrated logic circuit of hardware or instructions in a form of software in a processor, the steps of the method disclosed by the embodiment of this application may be directly embodied as being executed and completed by a hardware decoding processor, or may be executed and completed by using a combination of hardware and software modules in the decoding processor. The software module may be stored in a storage medium that is mature in the art, such as a random access memory, a flash memory, a read-only memory, a programmable read-only memory, an electrically erasable programmable memory, or a register. The storage medium is located in the memory. The processor reads information in the memory and completes the steps in the above method embodiments in combination with hardware thereof.

Through the technical solution of this application, the station (STA) may firstly determine the interference information of a target channel between the STA and the access point (AP) connected therewith currently, and then determines the target network access parameter group corresponding to the interference information. After disconnected from the AP, the STA may access the AP again according to the above target network access parameter group. In other words, under the condition of the certain interference degree, the STA may select the proper network access parameter group, and thus the image quality of the cloud video application and the operation smoothness for the user are guaranteed.

Figure 6:
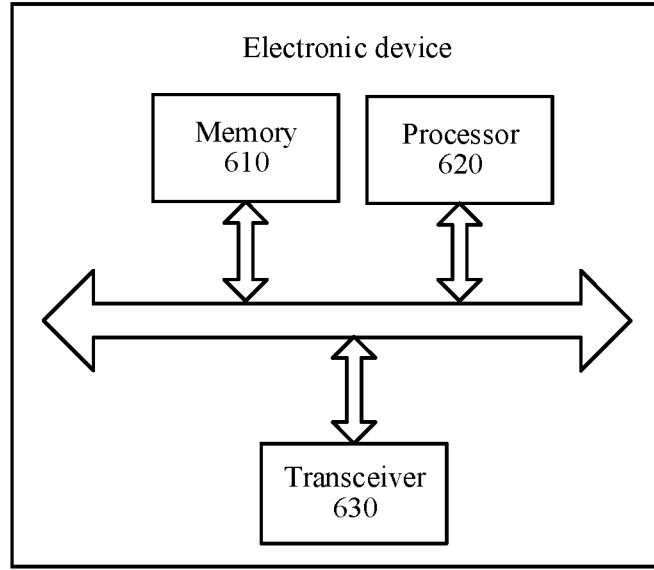
FIG. 6 is a schematic block diagram of an electronic device 600 provided by an embodiment of this application.

FIG. 6 is a schematic block diagram of an electronic device 600 provided by an embodiment of this application.

As shown in FIG. 6, the electronic device 600 may include:

a memory 610 and a processor 620, the memory 610 being configured to store a computer program and transmit program codes to the processor 620. In other words, the processor 620 may call and run the computer program from the memory 610 to implement the method in the embodiments of this application.

For example, the processor 620 may be configured to execute the above method embodiments according to instructions in the computer program.

In some embodiments of this application, the processor 620 may include but not limited to:

a general-purpose processor, a digital signal processor (DSP), an application specific integrated circuit (ASIC), a field programmable gate array (FPGA), or other programmable logic devices, a discrete gate or transistor logic device, a discrete hardware component, and the like.

In some embodiments of this application, the memory 610 includes but not limited to:

a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms are available, for example, a static RAM (SRAM), a Dynamic RAM (DRAM), a synchronous DRAM (SDRAM), a double data rate SDRAM (DDRSDRAM), an enhanced SDRAM (ESDRAM), a synch link DRAM (SLDRAM), and a direct Rambus RAM (DRRAM).

In some embodiments of this application, the computer program may be divided into one or more modules, the one or more modules are stored in the memory 610 and executed by the processor 620 to complete the method provided by this application. The one or more modules may be a series of computer program instruction segments capable of completing specific functions, and the instruction segments are used for describing an executing process of the computer program in the electronic device.

As shown in FIG. 6, the electronic device may further include:

a transceiver 630, which may be connected to the processor 620 or the memory 610.

The processor 620 may control the transceiver 630 to communicate with other devices, specifically, possibly send information or data to the other devices or receive information or data sent by the other devices. The transceiver 630 may include a transmitter and a receiver. The transceiver 630 may further include antennas, and there may be one or a plurality of antennas.

It is to be understood that all the components in the electronic device connected by using a bus system, where in addition to a data bus, the bus system further includes a power bus, a control bus and a status signal bus.

This application further provides a computer storage medium, storing a computer program. The computer program, when executed by a computer, causes the computer to execute the method in the above method embodiments.

An embodiment of this application further provides a computer program product containing instructions, and the instructions, when executed by a computer, causes the computer to execute the method in the above method embodiments.

When software is used for implementation, implementation may be entirely or partially performed in the form of a computer program product. The computer program product includes one or more computer instructions. When the computer program instructions are loaded and executed on the computer, all or part of flows or functions according to the embodiments of this application are generated. The computer may be a general-purpose computer, a special-purpose computer, a computer network, or another programmable apparatus. The computer instructions may be stored in the computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any available medium capable of being accessed by a computer or a data storage device containing a server, a data center and the like integrated with one or more available media. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that all the exemplary modules and algorithm steps described with reference to the embodiments disclosed herein can be implemented in electronic hardware, or a combination of computer software and electronic hardware. Whether these functions are executed in a form of hardware or software depends on particular applications and design constraint conditions of the technical solutions. A person skilled in the art may use different methods to implement the described functions for each particular application, but it is not considered that the implementation departs from the scope of this application.

In the several embodiments provided in this application, it is to be understood that the disclosed system, apparatus, and method may be implemented in other manners. For example, the foregoing described apparatus embodiment is merely exemplary. For example, the module division is merely logical function division and may be other division in actual implementation. For example, a plurality of modules or components may be combined or integrated into another system, or some features may be ignored or not executed. In addition, the displayed or discussed mutual couplings or direct couplings or communication connections may be indirect couplings or communication connections between the apparatuses and the modules through some interfaces, which may be electronic, mechanical, or other forms.

The modules described as separate components may or may not be physically separate, and the components displayed as modules may or may not be physical modules, may be located in one position, or may be distributed on a plurality of network units. Some or all of the modules may be selected according to actual needs to achieve the objectives of the solutions of the embodiments. In addition, all the functional modules in all the embodiments of this application may be integrated into one processing module, or each of the modules may exist alone physically, or two or more modules are integrated into one module.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely specific implementations of this application, but are not intended to limit the scope of protection of this application. Any variation or replacement readily figured out by persons skilled in the art well known to them within the technical scope disclosed in this application falls within the scope of protection of this application. Therefore, the protection scope of this application is subject to the protection scope of Claims.

What is claimed is:

1. A method for accessing a wireless network performed by an electronic device acting as a station (STA), the method comprising:
scanning a plurality of frequency bands corresponding to a plurality of Wi-Fi channels between the STA and an access point (AP) using a plurality of network access parameter groups to determine respective interference information associated with the plurality of Wi-Fi channels according to the scanning result;
establishing a mapping table between the respective interference information associated with the plurality of Wi-Fi channels and the plurality of network access parameter groups, wherein each index in the mapping table indicates an optimized network access parameter group under a predefined set of interference conditions;
determining interference information of a target channel, the target channel being a Wi-Fi channel currently connected between the STA and the AP;
determining a target network access parameter group corresponding to the interference information according to the mapping table;
disconnecting the target channel between the STA and the AP; and
accessing the AP via a new Wi-Fi channel established between the STA and the AP according to the target network access parameter group.

2. The method according to claim 1, wherein, before the determining a target network access parameter group corresponding to the interference information, the method further comprises:
establishing a mapping relationship between the interference information and the target network access parameter group; and
the determining a target network access parameter group corresponding to the interference information comprising:

determining the target network access parameter group according to the mapping relationship and the interference information.

3. The method according to claim 2, wherein the establishing a mapping relationship between the interference information and the target network access parameter group comprises:
acquiring a plurality of network access parameter groups, the plurality of network access parameter groups comprising the target network access parameter group;
accessing the AP via a channel established between the STA and the AP according to each of the network access parameter groups under a condition of an interference corresponding to the interference information, and measuring an application index corresponding to the each of the network access parameter groups;
ranking application indexes corresponding to the plurality of network access parameter groups respectively to determine a best application index; and
establishing the mapping relationship between the interference information and the target network access parameter group corresponding to the best application index.

4. The method according to claim 1, wherein the determining interference information of a target channel comprises:
scanning at least part of a frequency band to obtain a scanning result, the part of the frequency band comprising: a first frequency band where the target channel is located and an adjacent frequency band of the first frequency band; and
determining the interference information according to the scanning result.

5. The method according to claim 1, wherein the interference information comprises at least one of the following: an interference degree and an interference score interval.

6. The method according to claim 1, wherein, after the accessing the AP via a new channel established between the STA and the AP according to the target network access parameter group, the method further comprises:
consulting with the AP for the target network access parameter group;
performing data transmission with a server according to a consulted target network access parameter group;
disconnecting the STA from the AP after the data transmission with the server is finished;
acquiring an original network access parameter group; and
accessing the AP via a channel established between the STA and the AP according to the original network access parameter group.

7. The method according to claim 1, wherein the determining interference information of a target channel comprises:
determining the interference information before the data transmission with a server starts.

8. The method according to claim 1, wherein the determining interference information of a target channel comprises:
determining the interference information when a pause operation for pausing data transmission with a server is acquired.

9. An electronic device, comprising:
a processor; and
a memory, configured to store executable instructions of the processor, the executable instructions stored in the memory, when executed by the processor, causing the electronic device acting as a station (STA) to perform a method for accessing a network including:

scanning a plurality of frequency bands corresponding to a plurality of Wi-Fi channels between the STA and an access point (AP) using a plurality of network access parameter groups to determine respective interference information associated with the plurality of Wi-Fi channels according to the scanning result;

establishing a mapping table between the respective interference information associated with the plurality of Wi-Fi channels and the plurality of network access parameter groups, wherein each index in the mapping table indicates an optimized network access parameter group under a predefined set of interference conditions;

determining interference information of a target channel, the target channel being a Wi-Fi channel currently connected between the STA and the AP;

determining a target network access parameter group corresponding to the interference information according to the mapping table;

disconnecting the target channel between the STA and the AP; and accessing the AP via a new Wi-Fi channel established between the STA and the AP according to the target network access parameter group.

10. The electronic device according to claim 9, wherein, before the determining a target network access parameter group corresponding to the interference information, the method further comprises:

establishing a mapping relationship between the interference information and the target network access parameter group; and the determining a target network access parameter group corresponding to the interference information comprising:

determining the target network access parameter group according to the mapping relationship and the interference information.

11. The electronic device according to claim 10, wherein the establishing a mapping relationship between the interference information and the target network access parameter group comprises:

acquiring a plurality of network access parameter groups, the plurality of network access parameter groups comprising the target network access parameter group;

accessing the AP via a channel established between the STA and the AP according to each of the network access parameter groups under a condition of an interference corresponding to the interference information, and measuring an application index corresponding to the each of the network access parameter groups;

ranking application indexes corresponding to the plurality of network access parameter groups respectively to determine a best application index; and establishing the mapping relationship between the interference information and the target network access parameter group corresponding to the best application index.

12. The electronic device according to claim 9, wherein the determining interference information of a target channel comprises:

scanning at least part of a frequency band to obtain a scanning result, the part of the frequency band comprising: a first frequency band where the target channel is located and an adjacent frequency band of the first frequency band; and determining the interference information according to the scanning result.

13. The electronic device according to claim 9, wherein the interference information comprises at least one of the following: an interference degree and an interference score interval.

14. The electronic device according to claim 9, wherein, after the accessing the AP via a new channel established between the STA and the AP according to the target network access parameter group, the method further comprises:

consulting with the AP for the target network access parameter group;

performing data transmission with a server according to a consulted target network access parameter group;

disconnecting the STA from the AP after the data transmission with the server is finished;

acquiring an original network access parameter group; and accessing the AP via a channel established between the STA and the AP according to the original network access parameter group.

15. The electronic device according to claim 9, wherein the determining interference information of a target channel comprises:

determining the interference information before the data transmission with a server starts.

16. The electronic device according to claim 9, wherein the determining interference information of a target channel comprises:

determining the interference information when a pause operation for pausing data transmission with a server is acquired.

17. A non-transitory computer-readable storage medium, storing a computer program, the computer program, when executed by a processor of an electronic device, causing the electronic device acting as a station (STA) to perform a method for accessing a network including:

scanning a plurality of frequency bands corresponding to a plurality of Wi-Fi channels between the STA and an access point (AP) using a plurality of network access parameter groups to determine respective interference information associated with the plurality of Wi-Fi channels according to the scanning result;

establishing a mapping table between the respective interference information associated with the plurality of Wi-Fi channels and the plurality of network access parameter groups, wherein each index in the mapping table indicates an optimized network access parameter group under a predefined set of interference conditions;

determining interference information of a target channel, the target channel being a Wi-Fi channel currently connected between the STA and the AP;

determining a target network access parameter group corresponding to the interference information according to the mapping table;

disconnecting the target channel between the STA and the AP; and accessing the AP via a new Wi-Fi channel established between the STA and the AP according to the target network access parameter group.

18. The non-transitory computer-readable storage medium according to claim 17, wherein, before the determining a target network access parameter group corresponding to the interference information, the method further comprises:

establishing a mapping relationship between the interference information and the target network access parameter group; and the determining a target network access parameter group corresponding to the interference information comprising:

determining the target network access parameter group according to the mapping relationship and the interference information.

19. The non-transitory computer-readable storage medium according to claim 18, wherein the establishing a mapping relationship between the interference information and the target network access parameter group comprises:

acquiring a plurality of network access parameter groups, the plurality of network access parameter groups comprising the target network access parameter group;

accessing the AP via a channel established between the STA and the AP according to each of the network access parameter groups under a condition of an interference corresponding to the interference information, and measuring an application index corresponding to the each of the network access parameter groups;

ranking application indexes corresponding to the plurality of network access parameter groups respectively to determine a best application index; and establishing the mapping relationship between the interference information and the target network access parameter group corresponding to the best application index.

20. The non-transitory computer-readable storage medium according to claim 17, wherein the determining interference information of a target channel comprises:

scanning at least part of a frequency band to obtain a scanning result, the part of the frequency band comprising: a first frequency band where the target channel is located and an adjacent frequency band of the first frequency band; and determining the interference information according to the scanning result.

* * * * *